(12) United States Patent
Yeung et al.

(10) Patent No.: US 6,240,428 B1
(45) Date of Patent: May 29, 2001

(54) IMPORT/EXPORT AND REPARTITIONING OF PARTITIONED OBJECTS

(75) Inventors: Sofia Yeung, Union City; Chung Chang, San Jose, both of CA (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 08/961,779

(22) Filed: Oct. 31, 1997

(51) Int. Cl.[7] .................................................. G06F 17/30
(52) U.S. Cl. .................................................. 707/206
(58) Field of Search ................................ 707/202, 203, 707/204, 205, 206, 100–104

(56) References Cited

U.S. PATENT DOCUMENTS

| | | | |
|---|---|---|---|
| 4,432,057 | * | 2/1984 | Daniell et al. ........................ 707/8 |
| 4,912,629 | * | 3/1990 | Shuler, Jr. ........................... 707/206 |
| 5,251,316 | * | 10/1993 | Anick et al. ........................ 707/101 |
| 5,333,314 | * | 7/1994 | Masai et al. ........................ 707/202 |
| 5,457,796 | * | 10/1995 | Thompson ........................... 707/203 |
| 5,560,003 | * | 9/1996 | Nilsen et al. ........................ 707/206 |
| 5,590,319 | * | 12/1996 | Cohen et al. ........................ 707/4 |
| 5,787,433 | * | 7/1998 | Plotkin et al. ........................ 707/101 |
| 5,819,299 | * | 10/1998 | Bejar ................................ 707/206 |
| 5,913,216 | * | 6/1999 | Kneuer et al. ........................ 707/101 |

OTHER PUBLICATIONS

M. W. Zimmerman, A. Taussig, K. Fryer; Microsoft Press Computer Dictionary; Microsoft Press; p. 305, 1997.*

* cited by examiner

*Primary Examiner*—Hosain T. Alam
*Assistant Examiner*—Jean Bolte Fleurantin
(74) *Attorney, Agent, or Firm*—Ditthavong & Carlson, P.C.

(57) ABSTRACT

An object, such as a relational database table, is partitioned into a plurality of subsets. Selected subsets, e.g. partitions, of the object are exported into a dump file, identifying each exported subset of data by writing a marker in the dump file. Selected subsets are imported from the dump file, by determining whether the marker in the dump file corresponds to the selected subsets, then conditionally importing the data associated with the marker. Objects are repartitioned by exporting the some of the subsets, reconfiguring the object, and importing the exported subsets back into the object.

42 Claims, 4 Drawing Sheets

IMPORT/EXPORT AND REPARTITIONING OF PARTITIONED OBJECTS

FIELD OF THE INVENTION

The present invention relates to database systems and, more particularly, to import and export of data to and from a database system, respectively.

BACKGROUND OF THE INVENTION

Many database systems provide import and export operations to transfer data to or from another database system or another version of the same database system. Thus, import/export functions can be used, for example, to move, archive, and backup data. The export operation writes data from a database into a transportable operating system file, called a "dump file." In exporting data, such as a table, database systems typically generate a series of high-level statements in a data description language (DDL) and store them in the dump file in a recognized file format. The DDL statements describe how to recreate the entire table and the metadata associated with that table. Metadata is information that describes how data is organized in a database, such as data dictionary information about what tables are in the database, what columns a table has, what indexes have been built for a table, and so forth.

When data exported into a dump file is imported, the target database system reconstitutes the tables, metadata, and other objects therein by executing the DDL statements through a high-level interface, such as a SQL (structured query language) layer. If the imported database tables do not currently exist on the target system, then the import function will execute DDL operations to set up the proper tables prior to importing the data. Some database systems provide a feature in which the proper DDL statements to set up the exported tables are included in the export file.

Import and export are useful in transferring data from a source database to a target database. To transfer data, a database administrator exports the desired data from the source database into a transportable dump file. The dump file would be transported to the target database system, for example, by physically moving a computer readable medium storing the dump file, e.g. a disk or magnetic tape. As another example, the dump file can be transmitted over a network to the target system, e.g. via the file-transfer protocol (FTP). Import and export can also support archival and restoration of data to recover from a system crash. In this case, data in a database system is periodically exported into a dump file, transferred onto a long-term storage medium, such as a magnetic tape, and stored in a safe place. To restore the backed up data, the tape or other storage medium is inserted into a tape drive accessible to the database system and the exported data stored thereon is imported.

A problem with conventional import/export utilities is that they typically operate at the granularity of the table level. In other words, tables are the smallest unit that can be imported/exported. Thus, when an import or export of a large table is being performed, it may take hours or even days. Users are normally blocked from performing any data manipulation (DML) commands on the table during this time, since such activities could create inconsistencies in the imported/exported data. However, this downtime can be unacceptably long for very large or mission-critical tables.

For example, some database systems implement on-line transaction processing (OLTP) applications, e.g. for processing airline reservations. In these applications, new transactions are recorded in a database table as they are made. Accordingly, these applications typically need to be up and running as much as possible, e.g. to allow customers to book reservations on a flight. In some cases, even an hour of downtime may not be acceptable. In addition, these databases typically contain entries for transactions covering years, and are accordingly very large. Consequently, such database use tables that are terabytes (trillions of bytes) in size. Thus, the huge size of these tables exacerbates the downtime of the database system that is importing or exporting the tables. It is difficult to improve the time to import/export a table, because of bottlenecks due to limited bandwidth of the disk controller and maximum load on the processor importing or exporting the table.

Furthermore, it is inefficient to require the import/export of an entire table if only a portion of the table needs to be imported/exported. In the example of the OLTP application, transactions tend to be stored in one very large table. If the table is periodically archived by the export operation, only a portion of the table at the time of the next backup actually contains data that was not previously backed up. However, since conventional export functions operate at the granularity of the table level, the entire table is exported, and then imported. Consequently, archiving an OLTP database is a lengthy process, requiring substantial periods of downtime, even if there is only a few megabytes of new data.

One approach around the table-level granularity import and export is to select the desired rows and write them to an operating system file. After creating this file, the user would manually edit the file to convert the contents therein into SQL INSERT statements for as many as the number of rows selected. Finally, to bring the data into a table, the user would apply the SQL INSERT statements in the file to the table. This approach suffers from performance difficulties because each INSERT statement is a separate SQL operation, rather than an array of rows inserted through a single import operation. Furthermore, the user must be granted very high levels of permission to perform this sequence of operations, compromising database system security. Security is important because this approach is cumbersome and error prone, making it desirable to protect the database system from user error.

SUMMARY OF THE INVENTION

There is a need for a system and method for importing and exporting data from a database at a level of granularity smaller than the table level, preferably at an enhanced performance and security relative to conventional workarounds.

There is a need to be able to export only new or changed data from an OLTP database table for archival and backup purposes.

There is a need to shorten the downtime due to importing or exporting, for example, caused by bottlenecks that result from the bandwidth of the disk controller and load on the processor importing or exporting the table.

These and other needs are met by the present invention in which a body of data, such as a table, is partitioned into subsets of data, which can be individually imported and exported. Thus, data can be imported and exported at a level of granularity smaller than the table level. These subsets can be based on when new data is added to the body of data, so that only recent data can be selectively exported. Furthermore, these subsets of data may be stored on different disk systems, spreading the workload around to different disk controller and processors.

Accordingly, one aspect of the invention is a computer-implemented method and computer-readable medium bearing instructions for exporting into a dump file at least some of a body of data, such as a relational database table or other object. The body of data is subdivided into subsets, for example, based on time-related, numerical, or alphabetical information contained in the body of data. Metadata descriptive of the body of data, such as how the body of data is subdivided into subsets, is stored in the dump file. One or more selected subsets are stored in the dump file by storing a marker descriptive of a selected subset and the data contained in the subset.

Another aspect of the invention is a computer-implemented method and computer-readable medium bearing instructions for importing data into a body of data by accessing a dump file containing one or more subset markers descriptive of a respective subset of the data, each subset marker is associated with data belonging to the respective subset. If one of the subset markers in the dump file is descriptive of a selected subset, then the data associated with the subset marker is imported into the body of data.

Yet another aspect of the invention is a computer-implemented method of repartitioning a body of data, subdivided into subsets, by exporting at least one selected subset into a dump file, reconfiguring the body of data according to new partitioning criteria, and importing the exported data into the body of data according to the new partitioning criteria.

Additional objects, advantages, and novel features of the present invention will be set forth in part in the description that follows, and in part, will become apparent upon examination or may be learned by practice of the invention. The objects and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for importing, exporting, and repartitioning partitioned objects are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
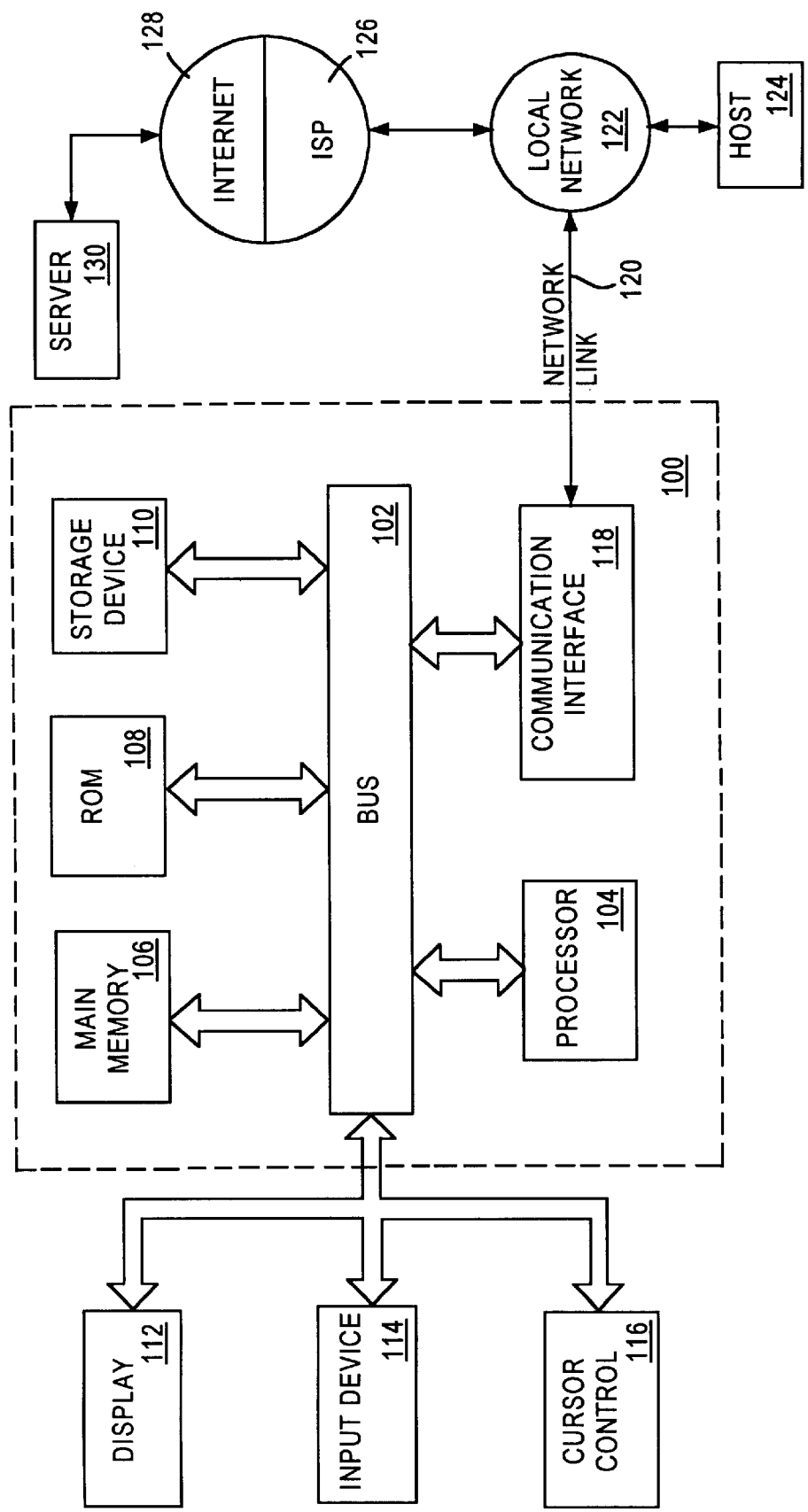
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for importing, exporting, and repartitioning partitioned objects. According to one embodiment of the invention, importing, exporting, and repartitioning partitioned objects are provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for importing, exporting, and repartitioning partitioned objects as described herein.

The received code may be executed by processor 104 as it is received, and/or stored in storage device 110, or other non-volatile storage for later execution. In this manner, computer system 100 may obtain application code in the form of a carrier wave.

Partitioning a Table

Bodies of data, such as relational database tables or other objects, may be subdivided into a plurality of disjoint subsets of data. One illustration of such a subdivision is partitioning a relational database table along one or more columns into distinct ranges. Serial column data is particularly advantageous for partitioning data into distinct ranges.

For example, a table storing ordering information for a retailer may include columns for the customer's surname, the date the order was made, the customer's address, the sales amount of the order, the invoice number, etc. In one case, this table can be partitioned alphabetically according to the customer's surname. If there are five partitions, the table can be subdivided into the following groups: surnames between A and E, between F and J, between K and O, between P and T, and between U and Z. In another case, this table can be partitioned by date the order was made. Thus, orders can be partitioned into those that were placed in 1995, in 1996, in January–March 1997, April–July 1997, August 1997, and September 1997. In another case, the table can be partitioned by invoice number, by zip code, or by similar partitioning criteria.

The partitioning criteria are part of the metadata associated with the table and the syntax of a DDL "CREATE" statement is enhanced to allow the partitioning of the table to be specified when the table is created. In the example, the following CREATE statement, with inessential details omitted, may be used to create the ordering table:

EXAMPLE 1

CREATE orders (surname, order_date, address, zip_code, sales_amount, invoice_number) PARTITIONED BY RANGE (surname)
PARTITION "p1" VALUE LESS THAN "F"
PARTITION "p2" VALUE LESS THAN "K"
PARTITION "p3" VALUE LESS THAN "P"
PARTITION "p4" VALUE LESS THAN "U"
PARTITION "p5";

In Example 1, a table called "orders," is created with columns called "surname," "order_date," "address," "zip_code" "sales_amount," and "invoice_number." The table is partitioned on the column "surname" into five subsets, named "p1," "p2," "p3," "p4," and "p5" for respective ranges, A–E, F–J, K–O, P–T, and U–Z. Each row in the table constitutes an order submitted by a customer and belongs to one of the partitions based on the alphabetical value of the customer's surname. Partitions of a table can be stored in different physical disk files and indeed on different storage devices to reduce contention for the disk controller.

Exporting Selected Partitions

According to one aspect of the present invention, a user such as a database administrator may export data from a table at a level of granularity smaller than the entire table, for example, at the partition level. In other words, the user can export any number of selected partitions of a table, from a single partition to all the partitions of the table. In one implementation, the user initiates the export operation by typing keystrokes via a keyboard or other input device 114 on a command line. Alternatively, by positioning a cursor control 116, such as a mouse, on display unit 112 over an icon representing the export operation and activating a button (e.g. by clicking) on the cursor control 116.

Figure 2:
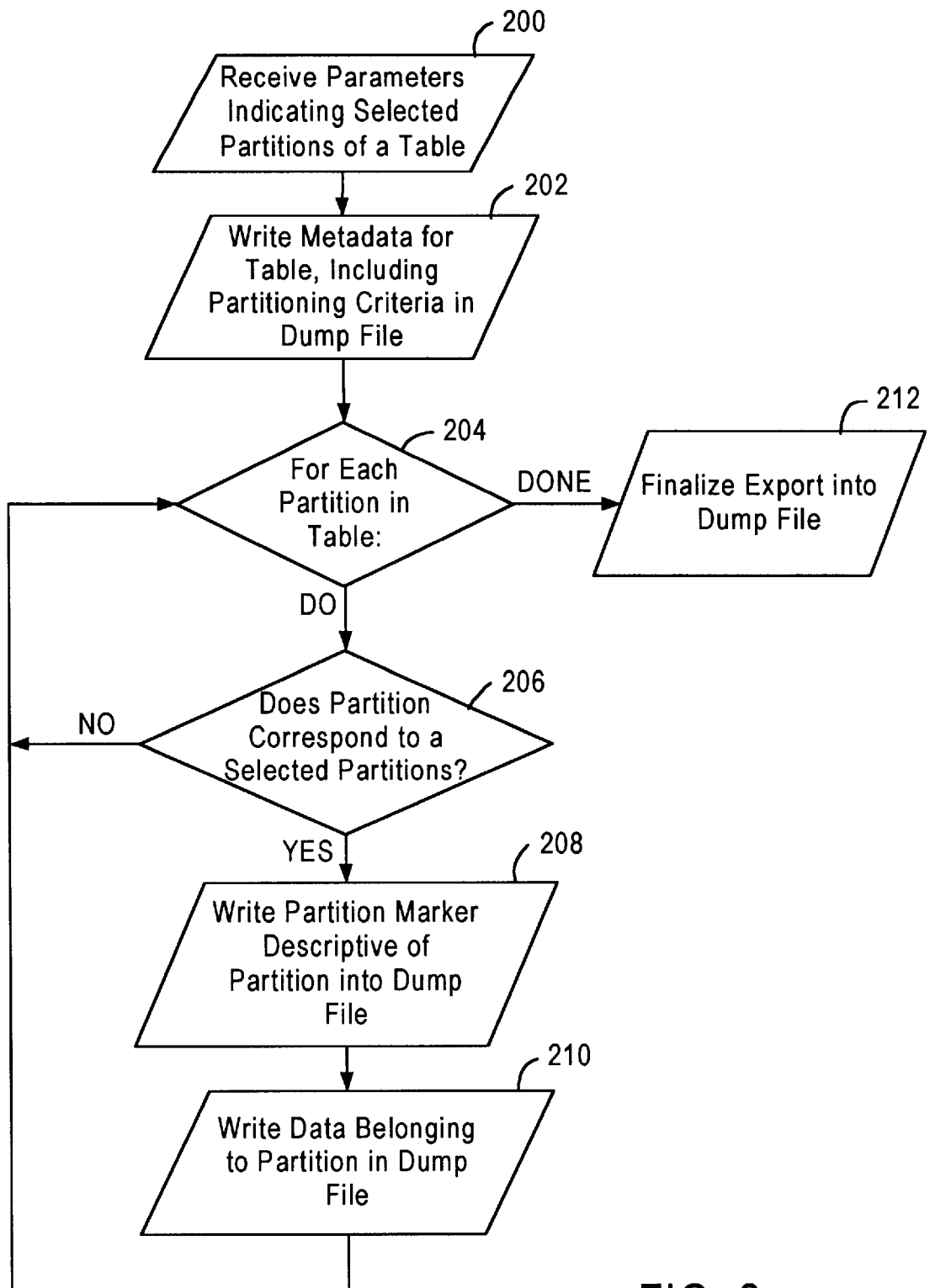
FIG. 2 is a flowchart illustrating the operation of exporting selected partitions according to one embodiment of the present invention.

When the export operation is initiated, a database system according to one embodiment of the present invention performs the steps illustrated in the flowchart shown in FIG. 2. In step 200, the export process receives parameters indicating which partitions of a particular table are desired to be exported. According to one implementation, these parameters may specified on the command line, for example with the syntax "TABLES=([schema.]table[:partition], . . . )." In the example, if a system administrator desires to export partition "p2" of table "order" belonging to user (schema) "scott" into a dump file called "export.dmp," then the following command line may be entered:

EXAMPLE 2

EXP system/manager FILE=export.dmp TABLES= (scott.order:p2)

In this syntax, if the partition specifier for a table is omitted, then all partitions of the table are implicitly specified, as if the user typed "table:*" where "*" indicates all partitions. Alternatively, in other user interfaces such as a graphical user interface, the export parameters may be received via a dialog box or the like.

According to one implementation, the database system builds a linked list of partition descriptors for each partition in the table. This descriptor contains the partition name, associated partition space information, and a flag indicating whether the partition has been selected for export. Preferably, the database system is configured to check each partition name specified in the parameters to determine if a partition of that name actually exists for the table. If a partition with that name exists in the table, then the flag in the corresponding partition descriptor is set to indicate that the partition is to be exported. In the example, a linked list of partition descriptors for the table of Example 1 includes five nodes, one for each partition thereof. With the export command illustrated in Example 2, only the flag of the second partition descriptor, for partition "p2," is set to indicate that the partition is selected. On the other hand, if no partition of the specified name can be found in the table, then an error message is output for the user. It is evident that the present invention is not limited to using a linked list, since other data structures, e.g. arrays, etc., may be used, as well-known in the art.

In step 202, the metadata for table is written as DDL commands in the dump file. This metadata includes partitioning criteria descriptive of the partitions for the table. In one implementation, the partitioning of the table can be specified by a CREATE table command with a PARTITION BY RANGE clause, as illustrated in Example 1 hereinabove with respect to the exemplary "orders" table. A marker indicative of the table, e.g. the string 'TABLE "orders",' is written to the dump file to identify table-specific data before writing the metadata in step 202.

In step 204, the export operation iterates through the partitions of the table. One approach is to traverse the linked list of descriptors by successively visiting each node of the list. For each partition in the table, the partition is checked to determine whether it corresponds to a selected partition (step 206). This determination can be performed by simply checking the flag in the partition descriptor. However, in other implementations, this determination may be performed by checking a bit vector initialized to indicate the selected partitions, a linked list of selected partitions. In fact, the determination performed in step 206 can be performed earlier, for example, between steps 200 and 202 by pruning the linked list of partition descriptors to include only those partitions that are selected. It is evident that other approaches may be adopted. Thus, the present invention is not limited to the particular data structures and preferred embodiments disclosed herein.

If the partition being checked is one of the selected partitions in the table, then execution of the export operation proceeds to step 208. On the other hand, if the partition being checked is not one of the selected partitions, then execution loops back to step 204, skipping steps 208 and 210. In the example, since only the second partition "p2" was selected, steps 208 and 210 are performed only for that partition.

In step 208, a partition marker descriptive of the partition is written into the dump file. According to one implementation, the string 'PARTITION "p2"' is written, where "p2" is the name of the selected partition, in the example. After the partition marker is written, then the data for partition is written into the dump file (step 210). In one embodiment, the rows belonging to the partition can be obtained through an enhanced SELECT statement with a "PARTITION (partition-name)" clause. The data written to the dump file, can be a DML "INSERT INTO TABLE" command to insert a range of rows into the table in one operation. If the partition does not contain data, then there is no data following the INSERT statement to help distinguish an empty partition from a non-selected partition. After the data for the partition has been dumped, then execution proceeds back to step 204 for the next iteration, if there is another iteration.

When execution loops back to step 204, the system continues with the next partition if there is another partition. When all the partitions have been processed, execution proceeds to step 212, where the export of data for the partition is finalized. This step is highly implementation dependent; however, in one implementation, a string "END-PARTITION <NOTALL>" is written if only some of the partitions were exported, that is, the number of partitions selected for export is less than the total number of partitions in the tables. If requested by a user, ANALYZE commands may be inserted for selected partitions to generate histograms and statistics for optimizations.

Consequently, exporting only selected partitions enables embodiments of the present invention to export data at a level of granularity smaller than the entire table. By writing partition markers in the dump file, other processes reading the dump file, e.g. import, can readily identify which data belongs to which partition and thus selectively operate on particular partitions. It is evident that data can be exported at a level of granularity smaller than the partition level, by using other subset markers indicative of subdivisions, e.g. sub-partitions, within partitions.

As mentioned earlier, OLTP databases employ tables that are very large, for example, in the terabyte range. Thus, it is advantageous to partition the OLTP tables based on transaction dates. Consequently, archival and backup procedures are simplified since only the most recent partitions need be exported. Thus, the export function lasts as long as it takes to export the new or changed data, not for the entire table. Furthermore, since partitions may be located at different disks or even different sites, data from different partitions of a huge table can be exported in parallel avoiding bottlenecks of disk access or processor cycles.

Importing Selected Partitions

According to another aspect of the present invention, a user such as a database administrator may import data from a dump file at a level of granularity smaller than the entire table, for example, at the partition level. Thus, the user can import any number of selected partitions from a dump file, from a single partition to all the partitions stored in the dump file. In one implementation, the user initiates the import operation by typing keystrokes via a keyboard or other input device 114 on a command line. Alternatively, by positioning a cursor control 116, such as a mouse, on display unit 112 over an icon representing the export operation and activating a button (e.g. by clicking) on the cursor control 116.

Figure 3:
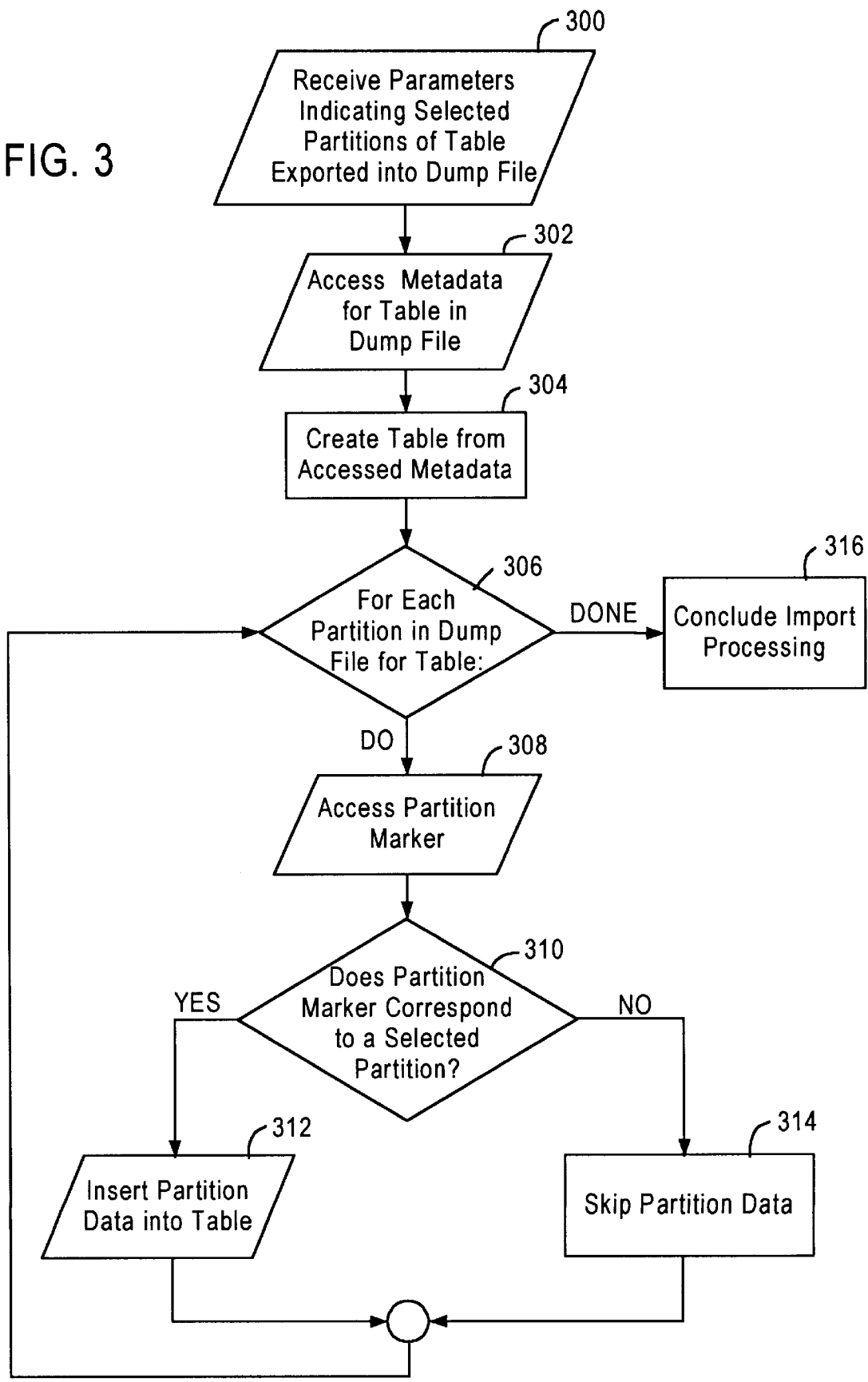
FIG. 3 is a flowchart illustrating the operation of importing selected partitions according to one embodiment of the present invention.

When the import operation is initiated, a database system according to one embodiment of the present invention performs the steps illustrated in the flowchart shown in FIG. 3. In step 300, the import process receives parameters indicating which partitions of a particular table are desired to be imported. According to one implementation, these parameters may specified on the command line, for example with the syntax "TABLES=([schema.]table[:partition], . . . )." In the example, if a system administrator desires to import partition "p2" of table "order" belonging to user (schema) "scott" from a dump file called "export.dmp," then the following command line may be entered:

EXAMPLE 3

IMP system/manager FILE=export.dmp TABLES= (scott.order:p2)

In this syntax, if the partition specifier for a table is omitted, then all partitions of the table are implicitly specified, as if the user typed "table:*" where "*" indicates all partitions. Alternatively, in other user interfaces such as a graphical user interface, the export parameters may be received via a dialog box or the like.

According to one implementation, the database system builds a linked list of partition nodes for each partition selected in step 300 in the dump file. This list contains the partition name and preferably a "found flag" indicating whether the partition has been found in the dump for error checking purposes. In the example, a linked list of partition nodes for the import command of Example 3 includes one node for partition "p2." The found flag is initially clearly to indicate that the partition is not (yet) found in the dump file. It is evident that the present invention is not limited to using a linked list, since other data structures, e.g. arrays, etc., may be used, as well-known in the art.

In step 302, the metadata for table, e.g. as DDL commands, is accessed in the dump file. This metadata includes partitioning criteria descriptive of the partitions for partitioned tables in the dump file. In one implementation, the partitioning of the table can be specified a CREATE table command with a PARTITION BY RANGE clause, as illustrated in Example 1 hereinabove with respect to the exemplary "orders" table. A marker indicative of the table, e.g. the string 'TABLE "orders",' is written to the dump file to identify table-specific data before writing the metadata in step 302.

At step 304, the import process attempts to create the table specified in the metadata accessed in step 302. If the table did not exist, the table is created based on the accessed metadata. In the example, if the orders table did not exist, then it would be created with the columns and partitions specified in the CREATE command illustrated in Example 1. If, on the other hand, the specified does exists, indicated by a "duplicate object" error, then the database system can either (1) generate an error message for the user explaining that the table already exists and terminate or (2) ignore the duplicate object error and use the partitioning of the existing table. A preferred embodiment of the present invention allows either behavior depending on a command line switch. For example, if the user specifies "IGNORE=Y" on the command line, then option (2), ignoring the duplicate object error, is performed. Otherwise, if the user specifies "IGNORE=N" on the command line, then option (1), generating the error message and terminating are performed. A preferred default value if the IGNORE key words is not specified is IGNORE=N.

In step 306, the import operation iterates through the partitions of selected tables in the dump file. One approach is to sequentially read the data in the dump file as a stream of characters until a partition marker is reached. When the partition marker is reached, the partition name is obtained from the partition marker (step 308). Preferably, the partition includes the name of the partition, so that obtaining the partition name can be easily parsed.

For each partition in the table, the partition is checked to determine whether it corresponds to a selected partition (step 310). This determination can be performed by simply checking the linked list of partition nodes initialized in step 300. More specifically, the linked list is traversed until a partition node is found storing the name of the current partition or until the list runs out of nodes. However, in other implementations, this determination may be performed by checking another data structure, such as a tree or a hash table. It is also evident that other approaches may be adopted. Thus, the present invention is not limited to the particular data structures and preferred embodiments disclosed herein.

If the name in the partition marker does correspond to one of the selected partitions, then execution branches to step 312, where the partition data is read out of the dump file and inserted into the table, preferably in a single operation, such as an array insertion. Each row is inserted without the PARTITION specification to allow each to be reclassified according to the partitioning criteria of the target table. This feature, in combination with the IGNORE=Y command line option, allows partitions to be merged and tables to be repartitioned as explained in more detail hereinafter. In addition, the found flag in the corresponding partition node is set. If there is an ANALYZE command present after the partition data, then statistics of the new data are computed at this point.

If, on the other hand, the name in the partition marker does not correspond to any of the selected partitions, then execution branches to step 314, where the partition is skipped, for example, by advancing a file pointer to the dump file past the partition data. Any ANALYZE commands present for this partition data are also skipped. In either event, execution loops back to step 306 for another iteration, if necessary.

After all the partitions for a table in the dump file have been processed, then the loop controlled by step 306 terminates and execution proceeds to step 316 to conclude the import processing. This step is also highly implementation dependent. For example, the import procedure may perform index maintenance. As another example, the found flags in the linked list of partition nodes can be checked to determine whether any found flags are still cleared. If there are cleared found flags remaining, then the import operation may display an error message to the user indicating that the user specified partitions that are not found in the dump file. If more than one table is exported, then steps 302–316 are repeatedly executed for each table until all the selected partitions in all the selected tables are processed with each of the table data being identified by respective table markers.

Since partition markers are written in the dump file, import processes can readily identify which data belongs to which partition and thus selectively import those particular partitions specified by a user. Thus, data can be imported at a level of granularity smaller than the table level: at the partition level. It is also evident that data can be exported at a level of granularity smaller than the partition level, if subset markers for smaller subdivisions, e.g. sub-partitions, are written into the dump file.

As mentioned earlier, it is advantageous to partition the OLTP tables based on transaction dates. Consequently, data restoration from backups is simplified since only those partitions containing data that needs to be restored can be imported. Thus, the import function lasts as long as it takes to import the selected partitions, not for the entire table. Furthermore, since partitions may be located at different disks or even different sites, data from different partitions of a huge table can be imported in parallel avoiding bottlenecks of disk access or processor cycles.

Accordingly the export and import operations described herein enable users to transfer, archive, or back up data from a table at a level of granularity smaller than an entire table. Therefore, it is unnecessary to use the cumbersome and error prone conventional technique of selecting rows into a file, modifying the file to insert each row individually into a table. Performance is enhanced because the import and export can insert a range of rows in one operation rather than individually. Database security is more tightly controlled, since permission can be granted to importing or exporting only, without having to grant permission to more powerful database operations.

Repartitioning Tables

The export and import operations described herein may be used to repartition a table. For example, a plurality of partitions can be merged into a single partition in a table, or a single partition in a table can be split into a plurality of partitions, or an entire table can repartitioned according to different partitioning criteria, e.g. using different columns in the table. In the example of the "orders" table (Example 1), a user may desire to change the partitioning criteria to partition by order date instead of customer surname.

Figure 4:
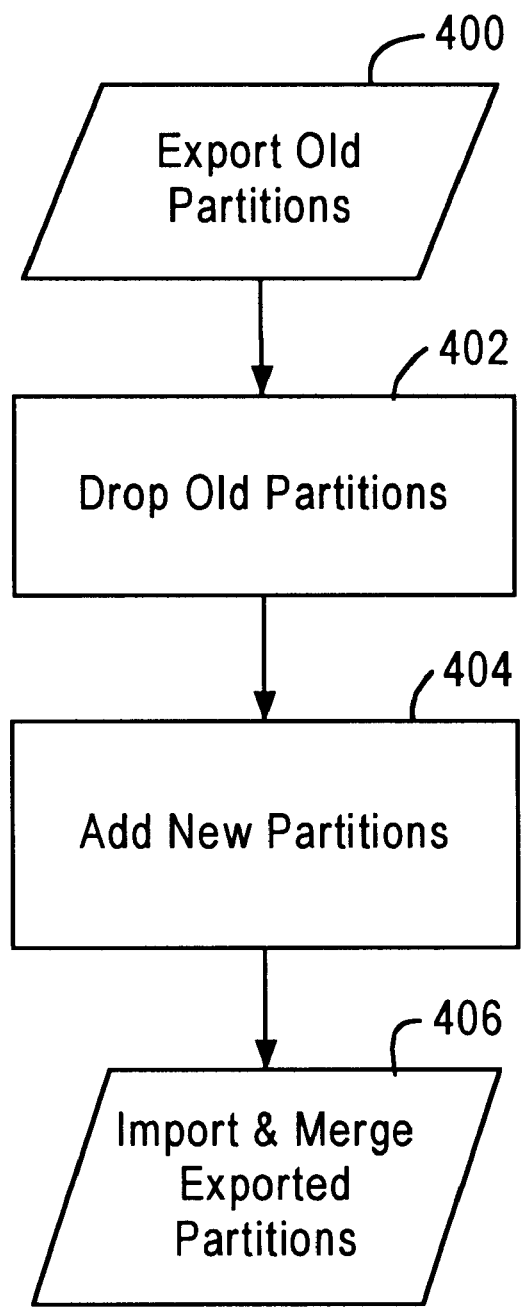
FIG. 4 is a flowchart illustrating the operation of repartitioning a table according to one embodiment of the present invention.

Accordingly, the database system, in response to a user's command, exports all the affected partitions of the table, in this example, all of the partitions, to a dump file, shown as step 400 of FIG. 4. For the merger and splitting example, only the partitions to be merge or the partition to be split, respectively, would be exported.

For merging partitions, on one hand, the user would command the database system to drop the old partitions (step 402), for example by executing an "ALTER TABLE orders DROP PARTITION" command. Dropping partitions causes the data in the partitions to be dropped as well. In step 404, the user adds the new partition, for example with an "ALTER TABLE orders ADD PARTITION" command.

For splitting partitions, on the other hand, the user would command the database system to drop the old partition (step 402), for example by executing an "ALTER TABLE orders DROP PARTITION" command. In step 404, the user adds the new partitions, for example with an "ALTER TABLE orders ADD PARTITION" command.

In step 406, the user executes the import command with the IGNORE=Y command to bring in the data from the exported partitions. In this manner, the import/export operations on partitioned objects at the partition level of granularity, enables users to reconfigure how tables are partitioned.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A computer-implemented method of exporting at least some of a body of data into a dump file, said method comprising the steps of:
    subdividing the body of data into a plurality of subsets;
    storing metadata descriptive of the body of data in the dump file; and
    storing one or more selected subsets from among the plurality of subsets in the dump file by performing the following steps for each of the one or more selected subsets:
        (a) storing a marker descriptive of said selected subset in the dump file, and
        (b) storing data contained in said selected subset in the dump file.

2. The method of claim 1, wherein the step of subdividing the body of data into a plurality of subsets includes the step of subdividing the body of data into the plurality of subsets based on time-related information contained in the body of data.

3. The method of claim 1, wherein the step of subdividing the body of data into a plurality of subsets includes the step of subdividing the body of data into the plurality of subsets based on serial information contained in the body of data.

4. The method of claim 3, wherein the step of subdividing the body of data into the plurality of subsets based on serial information contained in the body of data includes the step of subdividing the body of data into the plurality of subsets based on numerical information contained in the body of data.

5. The method of claim 3, wherein the step of subdividing the body of data into the plurality of subsets based on serial information contained in the body of data includes the step of subdividing the body of data into the plurality of subsets alphabetically based on textual information contained in the body of data.

6. The method of claim 1, further comprising the step of storing the plurality of subsets in respective storage devices.

7. The method of claim 1, wherein the step of storing metadata descriptive of the body of data in the dump file includes the step of storing partitioning metadata descriptive of how the body of data is subdivided into said plurality of subsets.

8. The method of claim 1, wherein the step of storing a marker descriptive of said selected subset in the dump file includes the step of storing a name of said selected subset in the dump file.

9. The method of claim 1, wherein the step of storing data contained in said selected subset in the dump file includes the step of storing said data contained in selected subset in the dump file immediately after storing the subset marker in the dump file.

10. The method of claim 1, wherein the step of storing one or more selected subsets from among the plurality of subsets in the dump file includes the step of storing a single selected subset from among the plurality of subsets in the dump file.

11. The method of claim 1, wherein the step of storing one or more selected subsets from among the plurality of subsets in the dump file includes the step of storing a fewer number of selected subsets than the number of the plurality of subsets in the dump file.

12. The method of claim 1, further comprising the step of granting permission to a user to export said body of data.

13. A computer-implemented method of importing data into a body of data comprising the steps of:
    accessing a dump file containing one or more subset markers descriptive of a respective subset of the data, each of said one or more subset markers associated with data belonging to the respective subset;

determining whether a marker of said one or more subset markers is descriptive of a selected subset; and if the marker of said one or more subset markers is descriptive of the selected subset, then importing the data associated with the subset marker into the body of data.

14. The method of claim 13, further comprising the step of subdividing the body of data into a plurality of subsets according to partitioning criteria;

wherein the step of importing the data associated with the subset marker into the body of data includes the step of importing the data into subsets of the table according to said partitioning criteria.

15. The method of claim 14, wherein the step of the step of subdividing the body of data into a plurality of subsets according to partitioning criteria includes the steps of:

accessing metadata stored in the dump file descriptive of said partitioning criteria; and creating the partitioned table based on the metadata.

16. The method of claim 13, wherein the step of importing the data associated with the subset marker into the body of data includes the step of storing the data associated the subset marker into a respective storage device.

17. The method of claim 13, further comprising the step of granting permission to a user to import into said body of data.

18. A computer-implemented method of repartitioning a body of data, subdivided into a plurality of subsets, comprising the steps of:

exporting one or more selected subsets from among the plurality of subsets of the body of data into a dump file;

reconfiguring the body of data according to new partitioning criteria; and importing data exported into the dump file into the body of data according to said new partitioning criteria.

19. The method of claim 18, the step of exporting one or more selected subsets from among the plurality of subsets of the body of data into a dump file includes the steps of:

storing metadata descriptive of the body of data in the dump file; and storing the one or more selected subsets in the dump file by performing the following steps for each of the one or more selected subsets:

(a) storing a marker descriptive of said selected subset in the dump file, and (b) storing data contained in said selected subset in the dump file.

20. The method of claim 19, wherein the step of storing metadata descriptive of the body of data in the dump file includes the step of storing partitioning metadata descriptive of how the body of data is subdivided into said plurality of subsets.

21. The method of claim 19, wherein the step of storing a marker descriptive of said selected subset in the dump file includes storing a name of said selected subset in the dump file.

22. The method of claim 19, wherein the step of storing data contained in said selected subset in the dump file includes the step of storing said data contained in selected subset in the dump file immediately after storing the subset marker in the dump file.

23. The method of claim 19, wherein the step of storing one or more selected subsets from among the plurality of subsets in the dump file includes the step of storing a single selected subset from among the plurality of subsets in the dump file.

24. The method of claim 19, wherein the step of storing one or more selected subsets from among the plurality of subsets in the dump file includes the step of storing a fewer number of selected subsets than the number of the plurality of subsets in the dump file.

25. The method of claim 19, further comprising the steps of:

granting permission to a user to export from said body of data; and granting permission to the user to import into said body of data.

26. A computer-readable medium bearing sequences of instructions for exporting at least some of a body of data into a dump file, said sequences of instructions comprising sequences of instructions for performing the steps of:

subdividing the body of data into a plurality of subsets;

storing metadata descriptive of the body of data in the dump file; and storing one or more selected subsets from among the plurality of subsets in the dump file by performing the following steps for each of the one or more selected subsets:

(a) storing a marker descriptive of said selected subset in the dump file, and (b) storing data contained in said selected subset in the dump file.

27. The computer-readable medium of claim 26, wherein the step of subdividing the body of data into a plurality of subsets includes the step of subdividing the body of data into the plurality of subsets based on time-related information contained in the body of data.

28. The computer-readable medium of claim 26, wherein the step of subdividing the body of data into a plurality of subsets includes the step of subdividing the body of data into the plurality of subsets based on serial information contained in the body of data.

29. The computer-readable medium of claim 28, wherein the step of subdividing the body of data into the plurality of subsets based on serial information contained in the body of data includes the step of subdividing the body of data into the plurality of subsets based on numerical information contained in the body of data.

30. The computer-readable medium of claim 28, wherein the step of subdividing the body of data into the plurality of subsets based on serial information contained in the body of data includes the step of subdividing the body of data into the plurality of subsets alphabetically based on textual information contained in the body of data .

31. The computer-readable medium of claim 26, wherein the step of storing metadata descriptive of the body of data in the dump file includes the step of storing partitioning metadata descriptive of how the body of data is subdivided into said plurality of subsets.

32. The computer-readable medium of claim 26, wherein the step of storing a marker descriptive of said selected subset in the dump file includes the step of storing a name of said selected subset in the dump file.

33. The computer-readable medium of claim 26, wherein the step of storing data contained in said selected subset in the dump file includes the step of storing said data contained in selected subset in the dump file immediately after storing the subset marker in the dump file.

34. The computer-readable medium of claim 26, wherein the step of storing one or more selected subsets from among the plurality of subsets in the dump file includes the step of storing a single selected subset from among the plurality of subsets in the dump file.

35. The computer-readable medium of claim 26, wherein the step of storing one or more selected subsets from among the plurality of subsets in the dump file includes the step of storing a fewer number of selected subsets than the number of the plurality of subsets in the dump file.

36. A computer-readable medium bearing sequences of instructions for importing data into a body of data, said sequences of instructions comprising sequences of instructions for performing the steps of:

accessing a dump file containing one or more subset markers descriptive of a respective subset of the data, each of said one or more subset markers associated with data belonging to the respective subset;

determining whether a marker of said one or more subset markers is descriptive of a selected subset; and if the marker of said one or more subset markers is descriptive of the selected subset, then importing the data associated with the subset marker into the body of data.

37. The computer-readable medium of claim 36, wherein said sequences of instructions further comprising sequences of instructions for performing the step of subdividing the body of data into a plurality of subsets according to partitioning criteria;

wherein the step of importing the data associated with the subset marker into the body of data includes the step of importing the data into subsets of the table according to said partitioning criteria.

38. The computer-readable medium of claim 37, wherein the step of the step of subdividing the body of data into a plurality of subsets according to partitioning criteria includes the steps of:

accessing metadata stored in the dump file descriptive of said partitioning criteria; and creating the partitioned table based on the metadata.

39. A method of exporting data from a table into a dump file, said table being subdivided into one or more partitions, comprising the steps of:

storing one or more markers descriptive of respective said one or more partitions in the dump file; and storing data contained in said one or more partitions in the dump file.

40. A method of exporting data from a table into a dump file, said table being subdivided into a plurality of partitions, comprising the steps of:

selecting a single partition from among the partitions;

storing a marker descriptive of the single partition in the dump file; and storing data contained in he single partition in the dump file.

41. A method of exporting data from a table into a dump file, said table being subdivided into a plurality of partitions, comprising the steps of:

selecting a fewer number of the partitions than the number of the plurality of partitions;

for each of the selected partitions, storing a corresponding marker descriptive of said each of the selected partitions in the dump file and storing data contained in said each of the selected partitions in the dump file.

42. A method of importing data into a table, said table being subdivided into a plurality of partitions, comprising the steps of:

accessing dump file containing a plurality of markers descriptive of respective said partitions, each of the markers associated with data belonging to a corresponding one of the respective partitions;

importing the data associated with a marker descriptive of a single partition.

* * * * *